United States Patent [19]
Gyorgy

[11] 3,855,256
[45] Dec. 17, 1974

[54] OIL OF TEMPEH

[76] Inventor: Paul Gyorgy, 201 Curwen Rd., Rosemont, Pa. 19010

[22] Filed: June 27, 1973

[21] Appl. No.: 374,074

Related U.S. Application Data

[62] Division of Ser. No. 155,252, June 21, 1971, Pat. No. 3,762,933.

[52] U.S. Cl. .......................................... 260/412.8
[51] Int. Cl. .............................................. C11b 1/10
[58] Field of Search .................................. 260/412.8

[56] References Cited
UNITED STATES PATENTS 3,696,133  10/1972  Lloyd et al ...................... 260/412.8
3,714,210  1/1973  Schweiger et al ................ 260/412.8

*Primary Examiner*—Elbert L. Roberts
*Attorney, Agent, or Firm*—Cooper, Dunham, Clark, Griffin & Moran

[57] ABSTRACT

Tempeh and components thereof, such as oil for tempeh, an extract of tempeh, are useful as stabilizers for food compositions, particularly edible fats and oils. An edible fat or oil containing tempeh or oil of tempeh or a component of oil of tempeh exhibits improved antioxidative properties and stability.

1 Claim, No Drawings

OIL OF TEMPEH

This is a division of application Ser. No. 155,252 filed June 21, 1971, now U.S. Pat. No. 3,762,933.

This invention relates to materials useful as stabilizing agents for foods and the like, such as fatty or oily foods, particularly edible oils and fats.

In accordance with one embodiment this invention is directed to food compositions, particularly edible oils and fats having improved stability. In accordance with another embodiment this invention is directed to the preparation of materials as stabilizers for edible oils and fats, such as materials useful as antioxidants in food compositions, particularly food compositions containing edible oils and fats. In accordance with yet another embodiment this invention is directed to a method of preparing edible oils and fats and food compositions containing the same so as to improve the stability and anti-oxidative properties of such compositions. In still yet another embodiment this invention is directed to the preparation of materials useful as stabilizing agents in food compositions.

Many food materials, particularly edible fats and oils, i.e., fats and oils of animal and vegetable origin or modified fats and oils of vegetable and animal origin, become rancid or have an undesirable taste and/or color imparted thereto during storage, and especially upon exposure to or contact with oxygen.

In accordance with one embodiment it is an object of this invention to provide edible fat and oil compositions of vegetable or animal origin having improved stability and anti-oxidative properties.

It is another object of this invention to provide a method of improving the anti-oxidative properties of edible fat- or oil-containing compositions.

It is another object of this invention to provide a process for the manufacture of anti-oxidative materials, particularly anti-oxidative materials derived from tempeh, a fermented soybean product.

How these and other objects of this invention are accomplished will become apparent in the light of the accompanying disclosure. In at least one embodiment of the practices of this invention at least one of the foregoing objects will be achieved.

It has been discovered that tempeh is useful as an antioxidant or stabilizers in food compositions, particularly for edible oils and fats. A component of tempeh which is a fermented soybean product, specifically oil of tempeh, has been found to be useful as a stabilizer or antioxidant for edible oils and fats. By edible oils and fats is meant those edible oils and fats of vegetable and-/or animal origin, or chemically modified, e.g., hydrogenated, edible oils and fats of vegetable and/or animal origin. The practices of this do not include oils or waxes of mineral or petroleum origin or synthetic hydrocarbon oils and waxes.

In applicant's co-pending patent application Ser. No. 32,424 filed Apr. 27, 1970 entitled "Foot Product Containing Tempeh", now U.S. pat. No. 3,762,933 it is disclosed that tempeh, particularly lyophilized tempeh, is useful in the preparation of food products, such as fish, or fatty meat food products, in that the resulting tempeh-containing food compositions exhibit improved stability. Applicant's above-identified co-pending patent application also discloses that during the fermentation of soybeans for the preparation of tempeh, a glycoside of soybean is split with the liberation of an antioxidant which has been identified as 6,7,4'-trihydroxyisoflavone, see P. Gyorgy, K. Murata and H. Ikehata, NATURE (London) 203, 870 (1964). The disclosures of applicant's above-identified patent application and the above-identified publication are herein incorporated and made part of this disclosure.

In accordance with one practice of this invention an edible oil or fat having incorporated therein tempeh, such as dried or lyophilized tempeh, or a component or extract of tempeh, e.g., oil of tempeh, has been found to possess antioxidative properties.

Oil of tempeh, a component or extract of tempeh, which has been found to be useful as a stabilizing agent or antioxidant for edible oils and fats is produced by extracting tempeh, a fermented soybean, with selective solvents. For example, oil of tempeh or tempeh oil is produced by extracting tempeh, preferably dry tempeh, obtained by fermenting soybeans with the fungus *Rhizopus oligosporus*, with a mixture of a normally liquid aliphatic hydrocarbon, such as an aliphatic hydrocarbon containing from four to 12 carbon atoms per molecule, e.g., hexane, and a normally liquid oxygen-containing, preferably aliphatic, polar organic compound containing from one to 10 carbon atoms per molecule, such as an alkanol, e.g., ethanol. A solvent admixture made up of the aliphatic hydrocarbon, e.g., one volume of hexane and a polar oxygen-containing organic compound, such as an alkanol, e.g., 0.5–5.0 volumes ethanol, is employed in an amount of about 5 volumes of this solvent admixture to one volume of tempeh. The resulting admixture of solvent and tempeh is maintained in contact, preferably at about room temperature, e.g., a temperature in the range 10°–40°C., for a sufficient period of time, e.g., in the range from about 2 minutes to about 2 hours, more or less, depending upon the intensity of mixing, temperature, etc. Thereupon, the liquid solvent admixture is separated from the undissolved or extracted tempeh and the separated liquid solvent and oil of tempeh-containing extract phase is then treated, such as by distillation, for the removal of the solvent hydrocarbon and the oxygenated polar organic compound therefrom. This remaining material identified herein as oil of tempeh or tempeh oil exhibits remarkable stability and possesses anti-oxidative properties. For example, oil of tempeh when stored for 17 months in a freezer and then for 21 days at a temperature of 37°C. exhibited a peroxide value (POV) of about 5.9 meq/kg. In contrast, commercial soya oil or soybean oil when maintained and tested under the same conditions exhibited a peroxide value of 81.4.

In these tests and in the other tests demonstrative of the practices of this invention the peroxide value was determined according to the method of D. H. Wheeler "Oil and Soap" 9, 89 (1932). This method is based upon the following procedure. A sample of the oil to be tested weighing 0.5 gram is placed in a 300 mls. flask with a glass stopper and there are added thereto 10 mls. of chloroform to dissolve the sample. Thereupon, 15 mls. of glacial acetic acid are added along with about 1 gram of powdered potassium iodide KI. The resulting admixture is then refluxed on a water bath for 3 minutes and then cooled in an ice water bath. Thereupon 75 mls. of distilled water are added and the resulting flask contents were vigorously shaken. After shaking there was added a drop of 1 percent starch solution and the flask contents then titrated with N/1000 sodium thiosulfate until the iodine I₂ color disappeared. The results of these tests are then calculated on meq/kg.

In accordance with still another embodiment of this invention the above-described tempeh oil or oil of tempeh, such as is produced by multiple (5) extraction of dry tempeh with a mixture of two parts hexane and one part ethanol is further treated and extracted to produce a component thereof exhibiting even more remarkably stabilizing or anti-oxidative properties. This component is obtained by extracting oil of tempeh with a 50 percent aqueous ethanol solution and the solvent then evaporated from the resulting extract phase. After removal of substantially all of the solvent the residue is then extracted with petroleum ether to produce a liquid oily phase and an insoluble, substantially solid phase. The insoluble phase is separated and 50 percent aqueous ethanol added thereto to yield an aqueous phase containing the insoluble material dispersed or emulsified therein. Acetone is then added to precipitate the solid material which is then separated, such as by filtration, and dried.

Following the above procedure there is recovered on the basis of 1 gram of tempeh oil an anti-oxidatively active component thereof in an amount of about 1 milligram. This material is effective when added on the basis of about one part per thousand to an edible oil or fat, such as soybean oil, to protect the oil or fat for a substantial period of time against oxidation.

For example, the POV of commercial soybean oil after storage for 8 days at 37°C. was 47. When the soya oil had incorporated therein an amount of 0.1 percent by weight of the aforesaid component extracted from tempeh oil the resulting soybean oil after storage under similar conditions had a POV of 21.

Further illustrative of the practices of this invention mixtures of commercial soybean oil and oil of tempeh prepared in accordance with this invention were stored at 60°C. for a number of days, 35 days and 43 days, and the peroxide values of these mixtures then determined. The results of these tests are set forth in accompanying Table I:

TABLE I

| Composition | POV After 35 Days | POV After 43 Days |
|---|---|---|
| 100% soybean oil | 118 | 270 |
| 90% soybean oil, 10% tempeh oil | 53 | 82 |
| 80% soybean oil, 20% tempeh oil | 33 | 30 |
| 70% soybean oil, 30% tempeh oil | 25 | 20 |
| 60% soybean oil, 40% tempeh oil | 10 | 13 |
| 50% soybean oil, 50% tempeh oil | 7 | 8 |
| 100% tempeh oil | 4 | 5 |

Further tests were carried out on mixtures of soybean oil and tempeh oil to determine stability of mixtures of these oils as measured by peroxide values, after storage for 35 days at 37°C. The results of these tests are set forth in accompanying Table II:

TABLE II

| Composition | POV After 35 Days |
|---|---|
| 100% soybean oil | 118 |
| 90% soybean oil, 10% tempeh oil | 55 |
| 80% soybean oil, 20% tempeh oil | 33 |
| 70% soybean oil, 30% tempeh oil | 26 |
| 60% soybean oil, 40% tempeh oil | 13 |
| 50% soybean oil, 50% tempeh oil | 8 |
| 100% tempeh oil | 7 |

Admixtures of commercial soybean oil and tempeh oil in accordance with this invention in the amount 40–80 percent by weight tempeh oil and 60–20 percent by weight soybean oil after storage or incubation for 18 days at 37°C. (1 gram in open scintillation counting vials) gave peroxide values in the range 17–5 whereas a commercially available stabilized soybean oil gave a peroxide value of 23. This test clearly demonstrated the superiority of a soybean oil stabilized with tempeh oil in accordance with this invention over commercially available stabilized soybean oils.

Further tests were carried out wherein mixtures of corn oil and tempeh oil and lard and tempeh oil were stored and incubated for 26 days at a temperature of 38°C. (2 grams in open scintillation counting vials) and the peroxide values then measured. The results of these tests are set forth in accompanying Table III:

TABLE III

| Composition | POV After 26 Days |
|---|---|
| 100% lard | 220 |
| 100% corn oil | 95 |
| 10% tempeh oil, 90% lard | 10 |
| 10% tempeh oil, 90% corn oil | 12 |
| 20% tempeh oil, 80% lard | 5 |
| 20% tempeh oil, 80% corn oil | 12 |
| 40% tempeh oil, 60% lard | 6 |
| 40% tempeh oil, 60% corn oil | 12 |

Further illustrative of the advantages of the practices of this invention the peroxide values of various oil mixtures were determined after storage at 60°C. The results of these tests are set forth in accompanying Table IV:

TABLE IV

POV OF VARIOUS OILS AFTER STORAGE AT 60°C.

| Oil Composition | | | DAYS OF STORAGE | | | | |
|---|---|---|---|---|---|---|---|
| | | | 0 | 3 | 7 | 14 | 20 |
| Cottonseed oil | | | 1.9 | 101.7 | 202.8 | 350.6 | |
| do. | + 10% | Tempeh oil | 3.3 | 64.4 | 113.9 | 190.7 | |
| do. | + 20% | do. | 5.4 | 34.8 | 89.2 | 112.4 | |
| do. | + 30% | do. | 3.9 | 6.6 | 26.4 | 82.5 | |
| do. | + 50% | do. | 10.8 | 5.7 | 5.3 | 48.3 | |
| Tempeh oil | | | 16.0 | 3.9 | 1.7 | 5.5 | |
| Safflower oil | | | 2.5 | 103.3 | 323.5 | 334.3 | |
| do. | + 10% | Tempeh oil | 3.7 | 70.1 | 133.1 | 258.4 | |
| do. | + 20% | do. | 6.8 | 39.6 | 90.4 | 168.2 | |
| do. | + 30% | do. | 8.6 | 11.6 | 61.1 | 100.2 | |
| do. | + 50% | do. | 7.1 | 3.7 | 6.0 | 48.7 | |
| Tempeh oil | | | 16.0 | 3.9 | 1.7 | 5.5 | |
| Lard | | | 2.0 | 67.2 | 133.6 | 176.4 | 188.5 |

TABLE IV—Continued

POV OF VARIOUS OILS AFTER STORAGE AT 60°C.

| Oil Composition | | | DAYS OF STORAGE | | | | |
|---|---|---|---|---|---|---|---|
| | | | 0 | 3 | 7 | 14 | 20 |
| do. | +10% | Tempeh oil | 5.0 | 5.0 | 3.8 | 10.7 | 12.6 |
| | +20% | do. | 4.9 | 2.7 | 1.8 | 3.6 | 8.1 |
| do. | +30% | do. | 5.7 | 3.9 | 3.8 | 5.0 | 2.9 |
| do. | +50% | do. | 6.9 | 1.7 | 1.8 | 2.7 | 3.8 |
| Tempeh oil | | | 15.0 | 2.8 | 1.0 | 4.7 | 3.1 |
| Corn oil | | | 1.0 | 17.3 | 93.3 | 314.0 | |
| do. | +10% | Tempeh oil | 2.0 | 5.7 | 17.2 | 89.0 | |
| do. | +20% | do. | 2.8 | 4.8 | 6.3 | 32.3 | |
| do. | +30% | do. | 2.8 | 3.4 | 1.7 | 9.0 | |
| do. | +50% | do. | 5.5 | 1.9 | 1.9 | 3.5 | |
| Tempeh oil | | | 15.0 | 2.8 | 1.0 | 4.7 | |

Tests (iodine values) were also carried out on two samples of tempeh oil and two samples of commercial soybean oil. The results of these tests show that the two samples of tempeh oil gave iodine values of 132.6 and 123.5 and the samples of soybean gave iodine values of 139.6 and 133.2.

As indicated hereinabove, in the extraction of tempeh oil or oil of tempeh from tempeh for use as an antioxidant in accordance with the practices of this invention various solvents and solvent mixtures might be employed. For example, it is preferred to employ as the hydrocarbon solvent an aliphatic (including cycloaliphatic) hydrocarbon or mixtures, such as a petroleum fraction comprised of predominantly aliphatic (including cycloaliphatic) hydrocarbons. A useful petroleum fraction would have an initial boiling point in the range 70°–170°F. and an end boiling point in the range 150°–350°F. Suitable hydrocarbons which might be employed in the preparation of solvent admixtures in accordance with this invention would include the pentanes, e.g., n-pentane, isopentane, the hexanes, such as n-hexane, and the various isohexanes, the heptanes, such as n-heptane, the octanes, such as n-octane, the nonanes, such as n-nonane. Aliphatic hydrocarbons which would be useful would include the saturated as well as the unsaturated, especially the mono-unsaturated or olefinic aliphatic hydrocarbons.

The other solvent, i.e., the oxygen-containing polar aliphatic (including cycloaliphatic) compound useful would include the various ketones, e.g., acetone, methyl ethyl ketone, methyl isobutyl ketone, as well as cyclohexanone, the ethers, the various alcohols, such as ethanol, butanol, isopropanol as well as cyclohexanol, the various esters, such as ethyl acetate and the like.

The practices of this invention are broadly applicable to food compositions which contain an edible oil or an edible fat. The practices of this invention are particularly useful for the preparation of edible oil and edible fats having improved anti-oxidative properties. Edible oils and fats and compositions, particularly food compositions containing edible oils and fats, which are improved by the incorporation therein of tempeh or oil of tempeh or a component of tempeh prepared in accordance with your invention would include the animal fats, such as tallow, beef fat, pork fat, lard, spermaceti, fats derived from fatty fish, meats and fish food compositions containing fats and the like, the edible oils both of animal and vegetable origin, such as olive oil, cottonseed oil, sperm or whale oil, safflower oil, peanut oil, corn oil, palm oil, cashew nut oil, soybean oil, mixtures thereof and the chemically modified, e.g., hydrogenated, fats and oils.

Other food compositions which have tempeh or oil of tempeh or a component of oil of tempeh usefully incorporated therein include special food products, particularly ready made or ready to use food products, for instance, soya meal or flour, milk powder and grain or crackers.

Substantial benefits of the practices of this invention are obtainable when only a minor amount of tempeh is incorporated in food compositions, particularly fat or oil-containing food compositions. Usually an amount upwards of about 0.5 percent of tempeh or oil of tempeh substantially improves the anti-oxidative properties of compositions containing the same. It is preferred in accordance with the practices of this invention to incorporate tempeh oil and tempeh or a component or extract of oil of tempeh in food compositions in an amount in the range from about 1 percent by weight up to about 20–25 percent by weight, more or less.

As will be apparent to those skilled in the art in the light of the foregoing disclosure, many modifications, alterations and substitutions are possible in the practice of this invention without departing from the spirit or scope thereof.

I claim:

1. Oil of tempeh useful as an antioxidant or stabilizing agent for edible oils and fats prepared by extracting tempeh, a fermented soybean product, with a liquid solvent consisting essentially of a low molecular weight aliphatic hydrocarbon, said aliphatic hydrocarbon containing four to 12 carbon atoms per molecule, and a low molecular weight oxygen-containing polar aliphatic organic compound, said polar organic compound containing from one to 10 carbon atoms per molecule, recovering the resulting liquid solvent extract phase and separating therefrom the solvent consisting essentially of said aliphatic hydrocarbon and polar organic compound to produce said oil of tempeh.

* * * * *